(12) United States Patent
Hirano et al.

(10) Patent No.: US 9,944,342 B2
(45) Date of Patent: Apr. 17, 2018

(54) STRADDLE-TYPE VEHICLE (71) Applicant: HONDA MOTOR CO., LTD., Tokyo (JP)

(72) Inventors: Kohei Hirano, Wako (JP); Yusuke Inoue, Wako (JP); Kyohei Hosoya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 15/163,340

(22) Filed: May 24, 2016

(65) Prior Publication Data
US 2016/0347393 A1    Dec. 1, 2016

(30) Foreign Application Priority Data

May 27, 2015 (JP) ................................. 2015-106982

(51) Int. Cl.
| | | |
|---|---|---|
| *B62J 35/00* | (2006.01) | |
| *B62J 17/00* | (2006.01) | |
| *B62J 23/00* | (2006.01) | |
| *B60K 15/067* | (2006.01) | |

(52) U.S. Cl.
CPC ............. *B62J 35/00* (2013.01); *B60K 15/067* (2013.01); *B62J 17/00* (2013.01); *B62J 23/00* (2013.01)

(58) Field of Classification Search
CPC .................................. B62J 35/00; B62J 17/00
See application file for complete search history.

(56) References Cited

U.S. PATENT DOCUMENTS

| | | | | |
|---|---|---|---|---|
| 6,213,514 B1 * | 4/2001 | Natsume | ................... | B62J 35/00 280/833 |
| 8,016,321 B2 * | 9/2011 | Shimomura | ............. | B62J 35/00 280/830 |
| 8,973,948 B2 * | 3/2015 | Kanai | ....................... | B62J 35/00 180/219 |
| 9,533,726 B2 * | 1/2017 | Kunisada | ................. | B62J 35/00 |

FOREIGN PATENT DOCUMENTS

| | | | | |
|---|---|---|---|---|
| EP | 2165921 A2 * | 3/2010 | ............. | B62J 23/00 |
| JP | 10-181658 A | 7/1998 | | |
| JP | H10181658 A | 7/1998 | | |
| JP | 2009214623 A | 9/2009 | | |
| WO | WO 2013179703 A1 | 12/2013 | | |
| WO | WO 2014051012 A1 | 4/2014 | | |

* cited by examiner

*Primary Examiner* — Kevin Hurley
(74) *Attorney, Agent, or Firm* — Birch, Stewart, Kolasch & Birch, LLP (57) ABSTRACT

A straddle-type vehicle capable of restricting input of a load from a fastening member, which joins multiple tank covers to each other, to the surface of a fuel tank. A fastening member designed to join a first tank cover and a second tank cover together is disposed to face the surface of a fuel tank and at least one of the first tank cover. The second tank cover has a convex portion facing the surface of the fuel tank at a position near the fastening member.

14 Claims, 12 Drawing Sheets

STRADDLE-TYPE VEHICLE

CROSS-REFERENCE TO RELATED APPLICATIONS

The present application claims priority under 35 USC 119 to Japanese Patent Application No. 2015-106982 filed May 27, 2015 the entire contents of which are hereby incorporated by reference.

FIELD OF THE INVENTION

This invention relates to a straddle-type vehicle, such as a motorcycle, in which a fuel tank is at least partially covered with a tank cover.

DESCRIPTION OF BACKGROUND ART

A straddle-type vehicle, such as a motorcycle, is known in which a fuel tank is at least partially covered with multiple tank covers. See, for example, Japanese Patent Application Publication No. Hei 10-181658.

In the straddle-type vehicle described in Japanese Patent Application Publication No. Hei 10-181658, an upper tank cover designed to cover an upper part of the fuel tank and each of side tank covers designed to cover side parts of the fuel tank are fastened to each other at their edges with screws with a part of the upper tank cover being fastened in a floating manner to the fuel tank via cushion members.

In this straddle-type vehicle, since the upper tank cover and each side tank cover joined to each other are fastened to the fuel tank in a floating manner, these tank covers are less likely to be displaced with respect to each other or with respect to the fuel tank even when the fuel tank swells.

However, in the straddle-type vehicle described in Japanese Patent Application Publication No. Hei 10-181658, the screws which are fastening members for fastening the upper tank cover and each side tank cover to each other at their edges are disposed to face the surface of the fuel tank. Accordingly, when a driver squeezes the left and right side tank covers firmly with his/her knees, for example, the screws being the fastening members come closer to the fuel tank, thus making it difficult to keep the clearance between the screws and the fuel tank within a desirable range.

SUMMARY AND OBJECTS OF THE INVENTION

In view of the above, according to an embodiment of the present invention, a straddle-type vehicle is capable of restricting the input of a load from a fastening member, which joins multiple tank covers to each other, to the surface of a fuel tank.

In order to solve the above problem, a straddle-type vehicle according to an embodiment of the present invention includes a fuel tank (50); a first tank cover (53) designed to cover a part of the fuel tank (50); and a second tank cover (54L, 54R) joined to the first tank cover (53) and designed to cover another part of the fuel tank (50), in which a fastening member (66) designed to join the first tank cover (53) and the second tank cover (54L, 54R) together is disposed to face an outer surface of the fuel tank (50). At least one of the first tank cover (53) and the second tank cover (54L, 54R) has a convex portion (67) facing the surface of the fuel tank (50) at a position near the fastening member (66).

With this configuration, when the first tank cover (53) and the second tank cover (54L, 54R) are deformed by application of external force on the first tank cover (53) and the second tank cover (54L, 54R), for example, in a direction in which the fastening member (66) comes closer to the outer surface of the fuel tank (50), the convex portion (67) makes contact with the surface of the fuel tank (50) and thereby restricts displacement of the fastening member (66). This restricts input of a load from the fastening member (66) to the fuel tank (50).

It is preferable that at least a part of the convex portion (67) is placed at a position closer to the outer surface of the fuel tank (50) than that of the fastening member (66).

In this case, when the first tank cover (53) and the second tank cover (54L, 54R) are deformed in the direction in which the fastening member (66) comes closer to the surface of the fuel tank (50), the convex portion (67) comes into contact with the surface of the fuel tank (50) earlier than the fastening member (66). Accordingly, no load is transmitted directly from the fastening member (66) to the fuel tank (50).

The straddle-type vehicle may be configured such that at least part of the convex portion (67) is placed at a position on an extension of a direction in which the fastening member (66) is fastened.

In this case, when the fastening member (66) having a long stem is mounted on the first tank cover (53) and the second tank cover (54L, 54R) by mistake, a tip part of the fastening member (66) comes to bump the convex portion (67) as the fastening member (66) is screwed down. This makes it possible to make an operator aware of the situation where the fastening member (66) that does not conform to specifications is about to be mounted by mistake.

The straddle-type vehicle may be configured such that the second tank cover (54L, 54R) is coupled to the first tank cover (53) with the fastening member (66) while being laid on an outer side of the first tank cover, the first tank cover (53) has an opening portion (53b-3) in a portion adjacent to a joint portion at which the first tank cover is joined to the second tank cover with the fastening member (66), and a shielding wall (68) protruding in a direction toward an inner surface of the second tank cover (54L, 54R) is provided on a part of an outer edge of the opening portion (53b-3).

In this case, the shielding wall (68) protrudes in the direction toward the inner surface of the second tank cover (54L, 54R) from the part of the outer edge of the opening portion (53b-3) of the first tank cover (53). Thus, even when a person looks into the inside through the gap between the parts of the first tank cover (53) and the second tank cover (54L, 54R) where they are joined to each other, the shielding wall (68) can prevent the opening portion (53b-3) from being visible through the gap at their joint.

The straddle-type vehicle may be configured such that the second tank cover (54L, 54R) is coupled to the first tank cover (53) with the fastening member (66) while being laid on the outer side of the first tank cover, and the first tank cover (53) is provided on an edge thereof with a flange portion (69) bending in the direction toward the inner surface of the second tank cover (54L, 54R) at a part closer to an end of the first tank cover than a position at which the first tank cover is joined with the fastening member (66) and being capable of making contact with the inner surface of the second tank cover.

In this case, since the flange portion (69) is provided on the edge of the first tank cover (53), the section modulus of the edge of the first tank cover (53) is increased, whereby the vicinity of a part for holding the fastening member (66)

located at the edge of the first tank cover (53) becomes less likely to be deformed. This makes the fastening member (66) less likely to be displaced in a direction toward the fuel tank (50) when a load is applied on the first tank cover (53) from the outside.

The straddle-type vehicle may be configured such that the fuel tank (50) has a joint flange (52) projecting outwardly in a vehicle widthwise direction with the first tank cover (53) having a fixation portion (53c, 62), which is capable of being secured to the fuel tank (50), at an end part thereof in a longitudinal direction of a vehicle. The flange portion (69), at a part of an edge thereof in the vehicle widthwise direction, has a bending portion (70) which is designed to cover the joint flange (52), at a remaining part of the edge in the vehicle widthwise direction.

In this case, since the bending portion (70) is provided on the edge of the first tank cover (53) on the outer side thereof in the vehicle widthwise direction, the section modulus of the edge of the first tank cover (53) in the vehicle widthwise direction is increased, which makes the edge of the first tank cover (53) further less likely to be deformed. In addition, when the first tank cover (53) is mounted on the fuel tank (50), the end part of the first tank cover in the longitudinal direction of the vehicle can be secured to the fuel tank (50) while the bending portion (70) on the edge of the first tank cover on the outer side thereof in the vehicle widthwise direction covers the joint flange (52) of the fuel tank (50). Thereby, with a simple configuration, the first tank cover (53) can be mounted on the fuel tank (50) easily and with high rigidity.

According to an embodiment of the present invention, at least one of the first tank cover and the second tank cover has the convex portion facing the surface of the fuel tank at a position near the fastening member. Thus, even if the first tank cover and the second tank cover are deformed by application of external force on the first tank cover and the second tank cover, for example, it is possible to restrict input of a load from the fastening member to the fuel tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, an embodiment of this invention will be described based on the drawings. Note that throughout the following description, directional terms such as front, rear, left, and right are identical to those directions in relation to a vehicle, unless otherwise noted. In addition, throughout the drawings, an arrow FR represents the front side of the vehicle, an arrow UP represents the upper side of the vehicle, and an arrow LH represents the left side of the vehicle.

Figure 1:
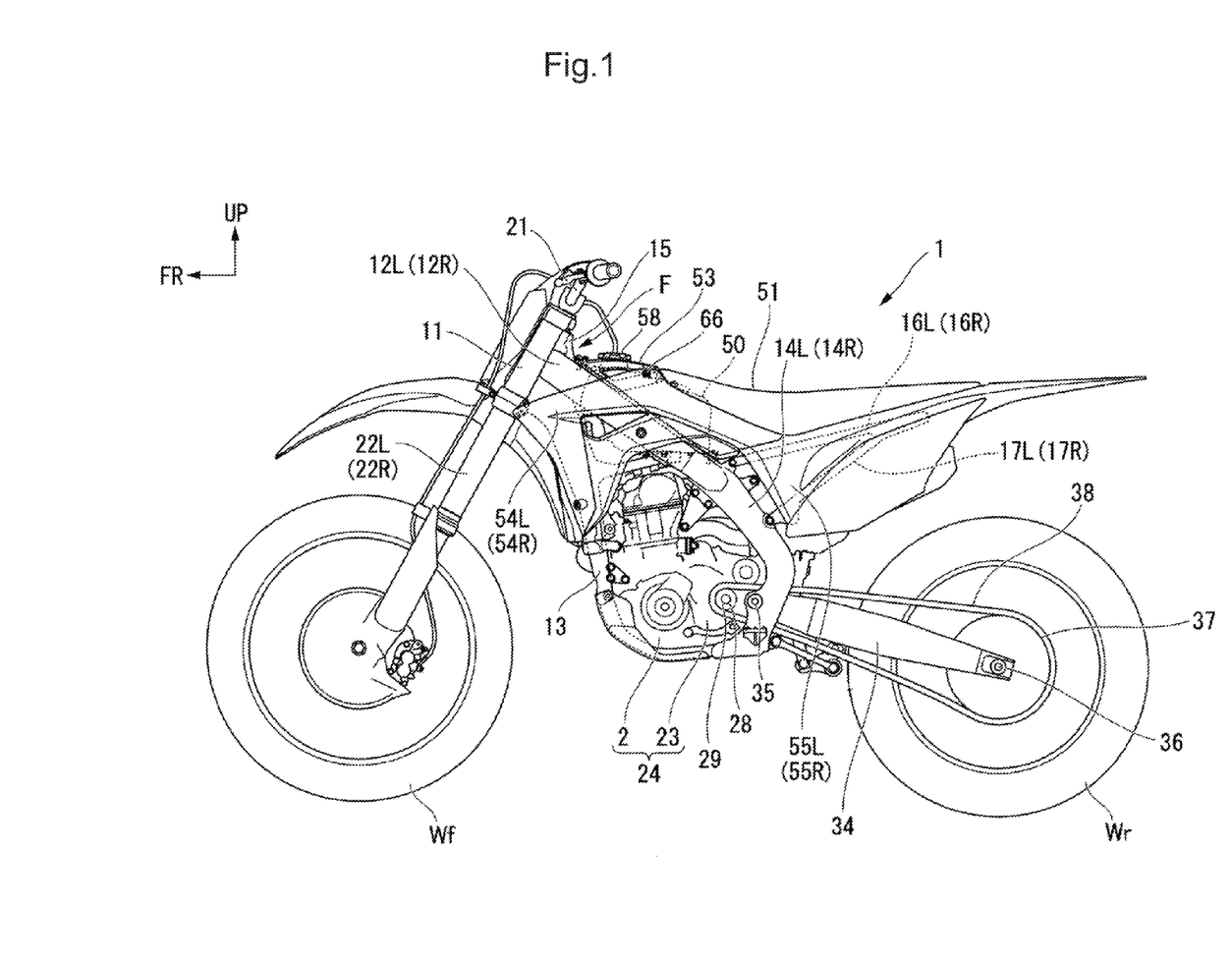
FIG. 1 is a side view of a straddle-type vehicle according to an embodiment of this invention.
Figure 2:
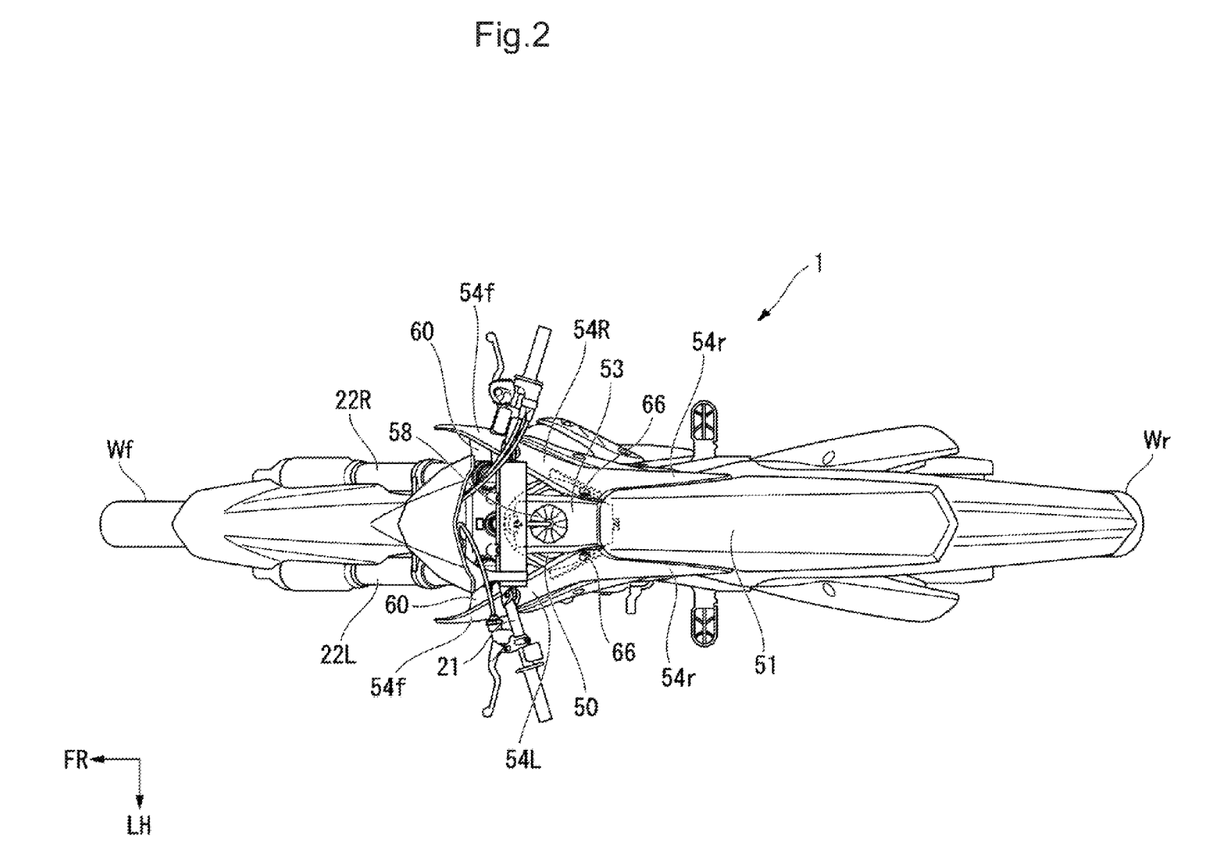
FIG. 2 is a top view of the straddle-type vehicle according to the embodiment of this invention.

FIG. 1 is a view of a straddle-type vehicle according to this embodiment as viewed from the left side, and FIG. 2 is a view of the straddle-type vehicle as viewed from the upper side.

The straddle-type vehicle according to this embodiment is an off-road type motorcycle in which a rear wheel Wr is driven by an engine 2. Hereinafter, the straddle-type vehicle according to this embodiment is referred to as a "motorcycle 1."

A body frame F of the motorcycle 1 includes a head pipe 11 disposed in its front end part; a pair of left and right main frame pipes 12L and 12R extending rearwardly and obliquely downwardly from the head pipe 11; a downpipe 13 extending downwardly from a lower position of a part of the head pipe 11 at which the head pipe and the pair of main frame pipes 12L and 12R are connected to each other; and a pair of center pipes 14L and 14R extending respectively from rear areas of the main frame pipes 12L and 12R while curing downwardly. A connecting block 15 to connect the left and right main frame pipes 12L and 12R to each other is coupled to front edge parts of the respective main frame pipes. In addition, the left and right center pipes 14L and 14R are coupled to each other at their proper positions via a cross pipe (not illustrated) extending in a vehicle widthwise direction.

The body frame F further includes a pair of left and right seat rails 16L and 16R extending toward the rear of a vehicle body from rear parts of the respective main frame pipes 12L and 12R and support pipes 17L and 17R connecting the center pipes 14L and 14R and rear areas of the seat rails 16L and 16R respectively.

Note that, some of the aforementioned members that overlap their counterparts in a front to back direction of the sheet and are thus hidden (the center pipe 14R, for example) are given reference numerals in parentheses for the sake of convenience of the drawing. In the following description, the members that overlap their counterparts and are thus hidden are treated in the same way.

A steering stem (not illustrated) is turnably and pivotally supported on the head pipe 11. A steering handlebar 21 and a pair of left and right front forks 22L and 22R are coupled to the steering stem. A front wheel Wf is rotatably and pivotally supported by lower end parts of the respective front forks 22L and 22R.

A fuel tank 50 is mounted on the left and right main frame pipes 12L and 12R so as to partially bulge above them. A seat 51 for a rider to sit on is mounted on the seat rails 16L and 16R located behind the fuel tank 50. In addition, an air cleaner (not illustrated) for filtering the air to be sucked into a cylinder portion of the engine 2 is disposed in an inner space in the vehicle widthwise direction of an area that is surrounded by the seat rails 16L and 16R, the center pipes 14L and 14R, and the support pipes 17L and 17R and has a substantially triangular shape in a side view.

An engine block 24 mainly composed of the engine 2 and a transmission 23 is installed in an area located below the main frame pipes 12L and 12R and sandwiched by the downpipe 13 and the center pipes 14L and 14R. The transmission 23 is coupled integrally to a rear part of a crankcase of the engine 2, and the transmission 23 is provided with an output shaft 28 for drawing power from the engine 2 to the outside. The output shaft 28 protrudes to the left in the vehicle widthwise direction with a drive sprocket 29 that is integrally coupled to an end of this protrusion.

In addition, a pivot shaft 35 is attached to lower edge parts of the respective left and right center pipes 14L and 14R. When the engine block 24 is mounted on the body frame F, the pivot shaft 35 is located at a position behind and near the output shaft 28 (drive sprocket 29) of the engine block 24. A front end part of a swing arm 34 is vertically swingably and pivotally supported on the pivot shaft 35. An axle 36 of the rear wheel Wr is rotatably and pivotally supported on a rear end part of the swing arm 34. A driven sprocket 37 is attached integrally to the axle 36 on the left side thereof in the vehicle widthwise direction. A drive chain 38 for transmitting power from the engine 2 to the rear wheel Wr is wound around the drive sprocket 29 on the engine block 24 side and the driven sprocket 37 at a rear part of the swing arm 34.

The swing arm 34 is supported by the body frame F via a shock absorber unit (not illustrated).

Figure 3:
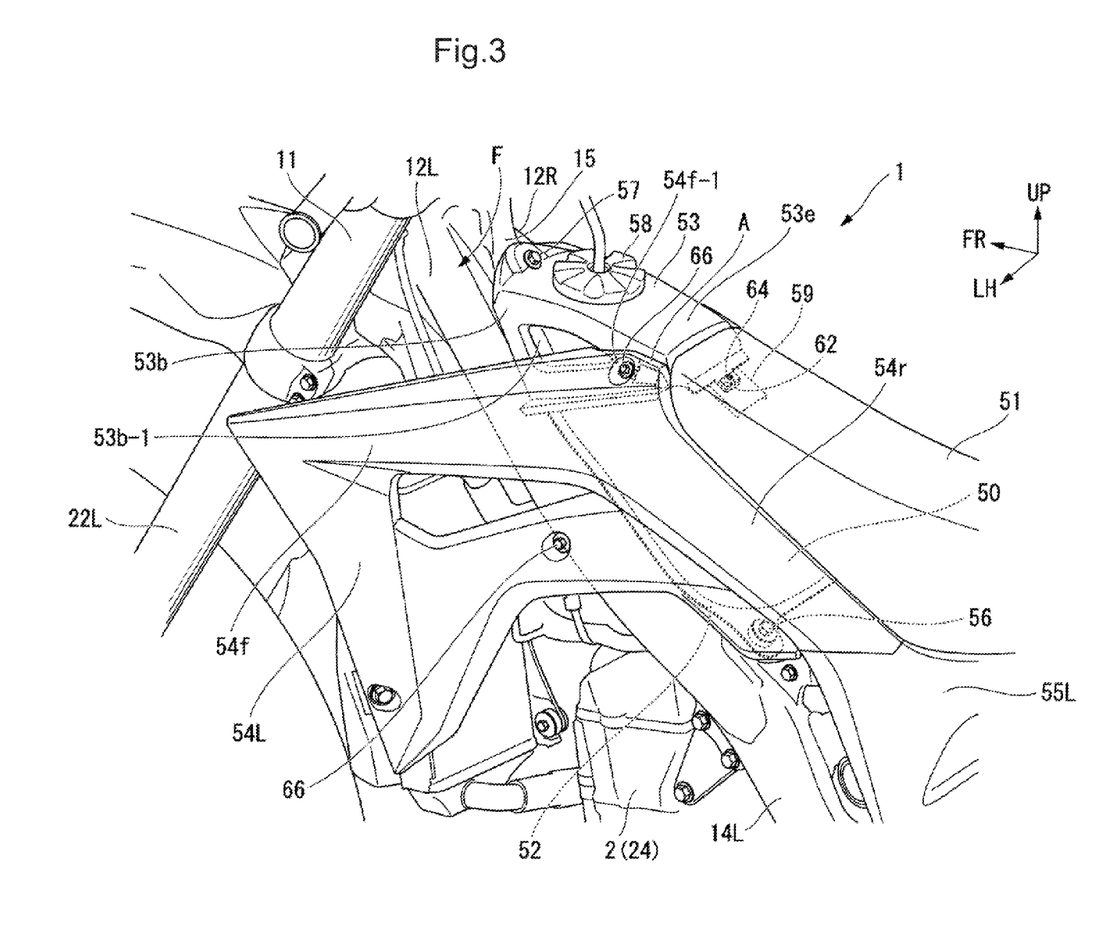
FIG. 3 is a perspective view of the straddle-type vehicle according to the embodiment of this invention.
Figure 4:
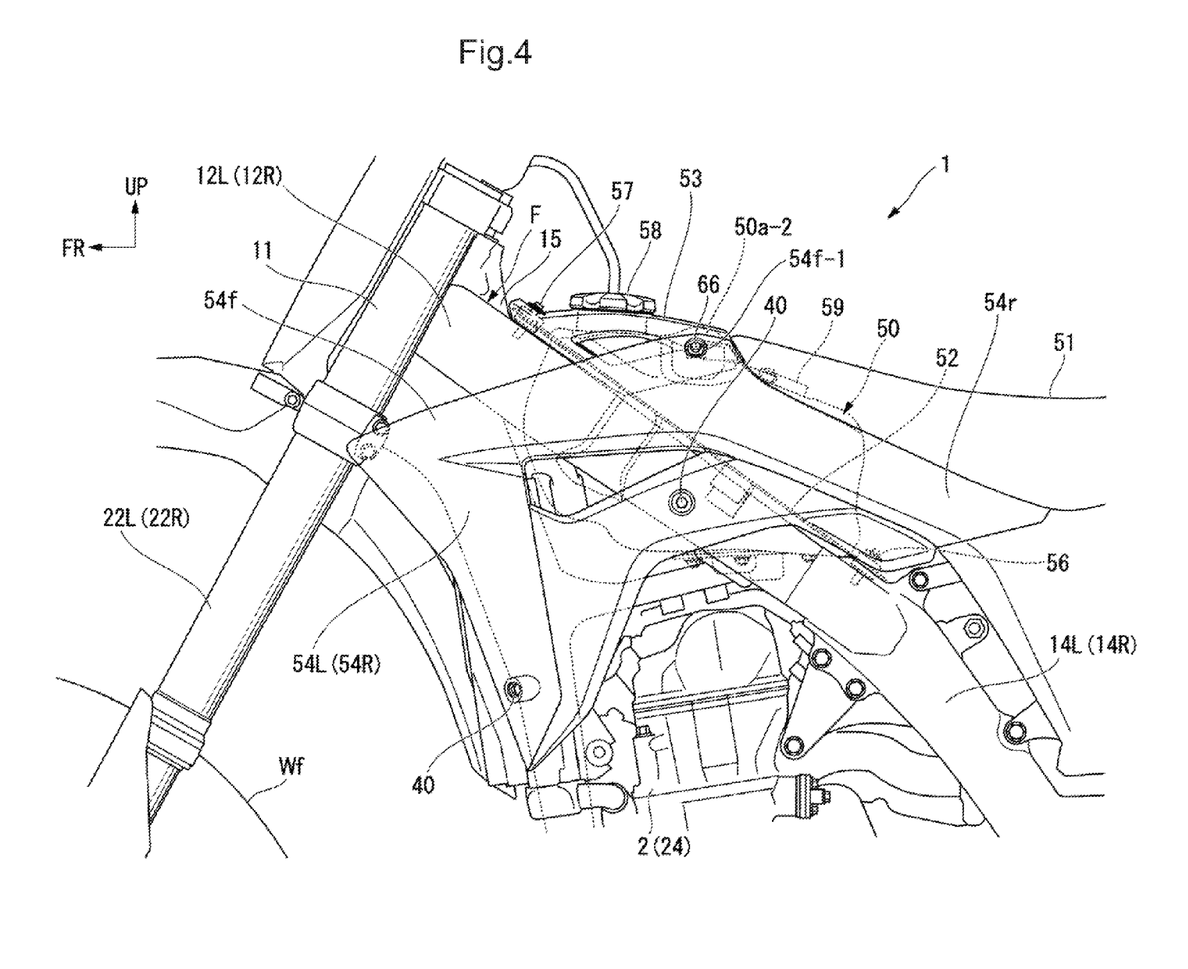
FIG. 4 is a side view of the straddle-type vehicle according to the embodiment of this invention.

FIG. 3 is a view of the left main frame pipe 12L of the motorcycle 1 and its surroundings as viewed from the rear left upper side, and FIG. 4 is a view of the left main frame pipe 12L of the motorcycle 1 and its surroundings as viewed from the left side.

As illustrated in these drawings, an upper surface of the fuel tank 50 on the front side thereof is partially covered with a resin-made top shelter 53 (first tank cover), and left and right side surfaces of the fuel tank 50 are partially covered with a pair of resin-made tank shrouds 54L and 54R (second tank cover). In addition, the upper surface and left and right side surfaces of the fuel tank 50 in an area ranging from the center to the rear side thereof are covered with an upper edge part of the seat 51. Resin-made side covers 55L and 55R cover the left and right sides of the air cleaner (not illustrated) at a position behind the left and right tank shrouds 54L and 54R.

Figure 5:
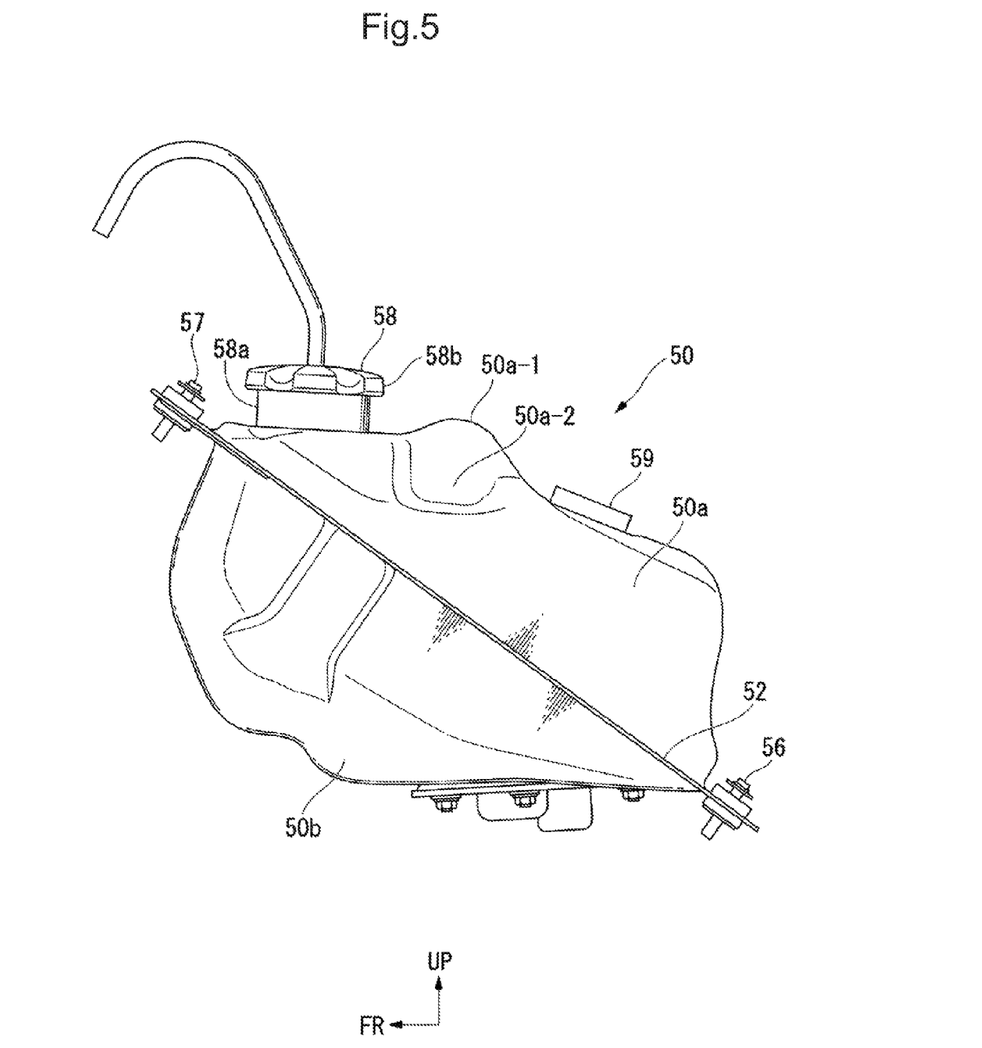
FIG. 5 is a side view of a fuel tank of the straddle-type vehicle according to the embodiment of this invention.

FIG. 5 is a view of the fuel tank 50 as viewed from the left side.

A main part of the fuel tank 50 according to this embodiment is made of a titanium alloy and/or the like. The fuel tank 50 has an upper half 50a and a lower half 50b joined together at their joint flange 52 and is formed to have a substantially rectangular shape in a side view. The joint flange 52 tilts downwardly toward the rear so as to extend substantially along the upper surfaces of the left and right main frame pipes 12L and 12R. In the fuel tank 50, as illustrated in FIGS. 3 and 4, left and right rear edge parts of the joint flange 52 are respectively fastened and secured to the upper surfaces of the main frame pipes 12L and 12R with bolts 56 via stays (not illustrated), and a front edge part of the joint flange 52 is fastened and secured to an upper surface of the connecting block 15 by a bolt 57.

A filler opening 50c (see FIG. 9) is provided in the upper surface of the upper half 50a of the fuel tank 50 on the front side thereof, and a filler cap 58 is detachably attached to the filler opening 50c. The filler cap 58 has a stem portion 58a designed to be screwed into the filler opening 50c with a grip portion 58b provided continuously on an upper end part of the stem portion 58a and designed to be gripped by an operator at the time of attachment/detachment of the filler cap 58.

In addition, a bulge portion 50a-1 is provided in the upper surface of the upper half 50a at a substantially central part thereof in a longitudinal direction, and the upper surface of the upper half at a position behind the bulge portion 50a-1 decreases in height in a step fashion and tilts downwardly toward the rear. Dent portions 50a-2 at which the upper half is partially dented inwardly in the vehicle widthwise direction are provided at both left and right sides of the bulge portion 50a-1. In addition, a locking stay 59 in the shape of a hat in cross section is attached, by welding or the like, on the upper surface of the upper half 50a at a position behind the bulge portion 50a-1. The locking stay 59 defines a substantially rectangular space with a small height between itself and the upper half 50a.

Figure 6:
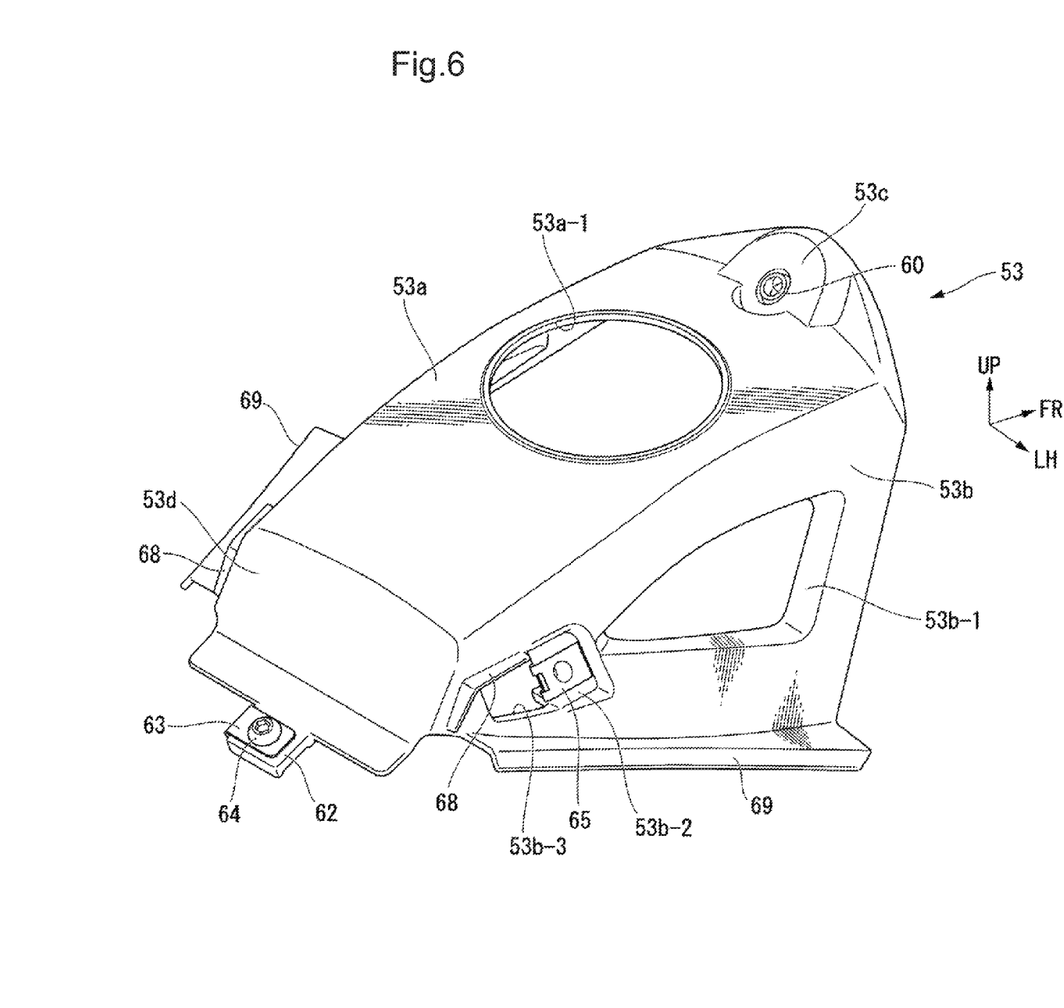
FIG. 6 is a perspective view of a first tank cover of the straddle-type vehicle according to the embodiment of this invention.
Figure 7:
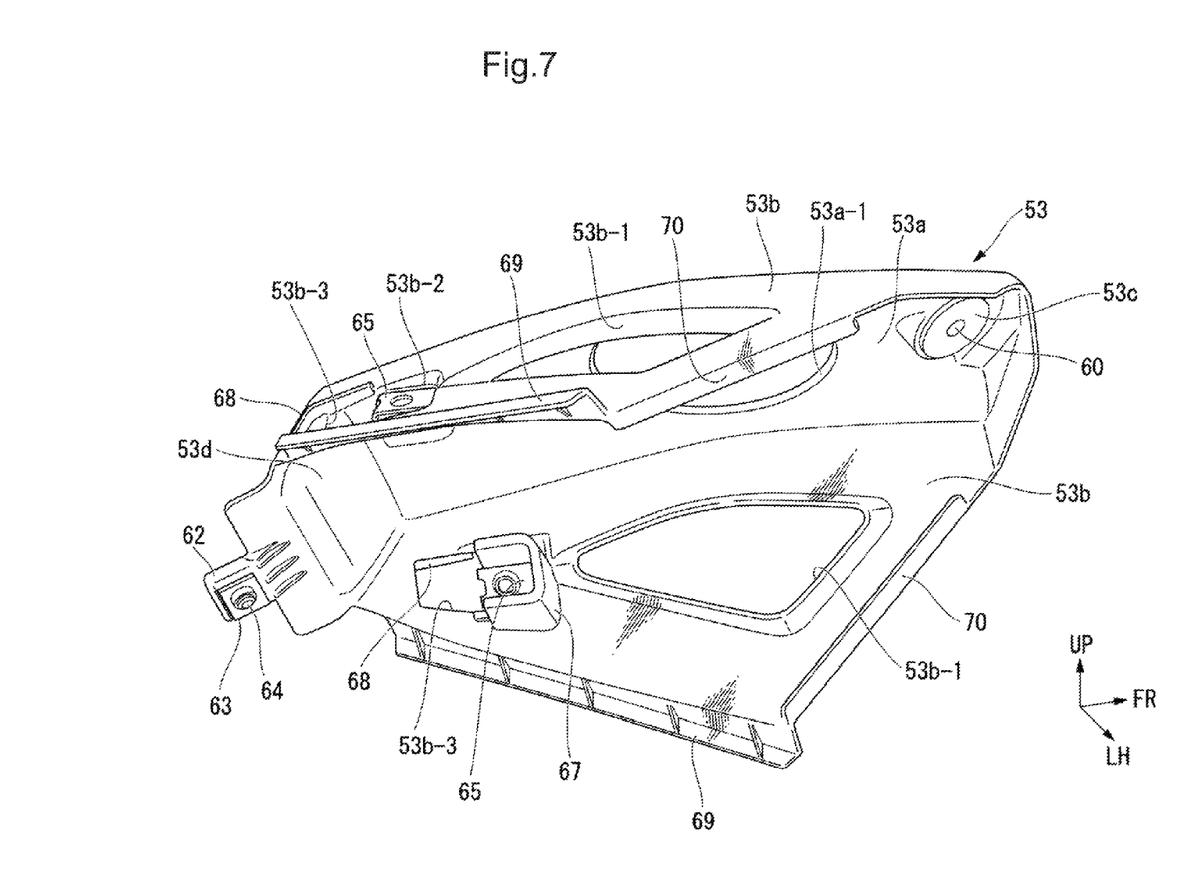
FIG. 7 is a perspective view of the first tank cover of the straddle-type vehicle according to the embodiment of this invention.
Figure 8:
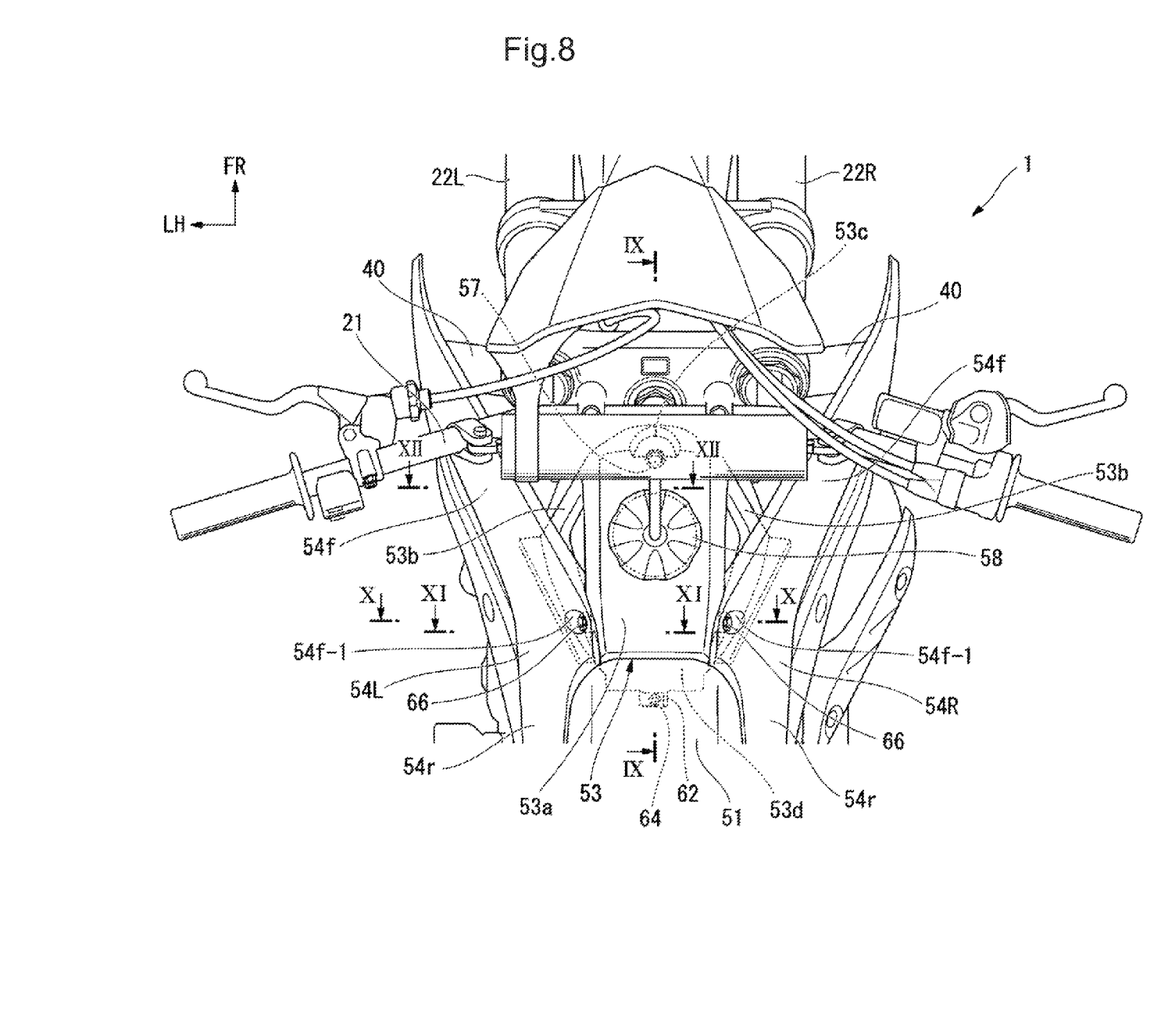
FIG. 8 is a top view of the straddle-type vehicle according to the embodiment of this invention.

FIG. 6 is a view of the top shelter 53, which is the first tank cover, as viewed from the front left upper side, and FIG. 7 is a view of the top shelter 53 as viewed from the rear left lower side. In addition, FIG. 8 is a view of a part right above the fuel tank 50 of the motorcycle 1 and its surroundings as viewed from the upper side, and FIGS. 9 to 12 are views illustrating cross sections of a part where the top shelter 53, the tank shroud 54L, and the fuel tank 50 are put together.

As illustrated in FIGS. 6 and 7, the top shelter 53 has an upper wall 53a that covers the upper surface of the fuel tank 50 on the front side thereof with a pair of sidewalls 53b that bends obliquely downwardly in an outward-opening manner from both left and right ends of the upper wall 53a and covers the left and right side surfaces of the fuel tank 50 on the front side thereof. Moreover, a front wall 53c bending and standing upwardly extends on a front end part of the upper wall 53a with a rear wall 53d bending downwardly and extending on a rear end part of the upper wall 53a.

As illustrated in FIGS. 3 and 4, the left and right tank shrouds 54L and 54R each have: a front edge area 54f extending forward from its substantially central area in the longitudinal direction while expanding outward in the vehicle widthwise direction with a rear edge area 54r extending rearwardly from the substantially central area substantially along a side lower end of the seat 51. The front edge area 54f has an upper side tilting in a forward direction and downwardly. Thus, a front end part of the front edge area 54f converges at an acute angle toward the front. As illustrated in FIG. 8, a part near the front end part of the front edge area 54f is supported by the downpipe 13 via a stay 71. An edge part of the front edge area 54f close to its rear upper end is placed so as to cover an outer side in the vehicle widthwise direction of the sidewall 53b of the top shelter 53. The edge part of the front edge area 54f close to its rear upper end has a joint portion 54f-1 at which the front edge area is joined to the sidewall 53b of the top shelter 53 with a bolt 66 which is a fastening member.

The left and right tank shrouds 54L and 54R are fastened and secured to stays (not illustrated), which are supported by the center pipes 14L and 14R and a radiator, at proper positions with bolts 40.

Figure 9:
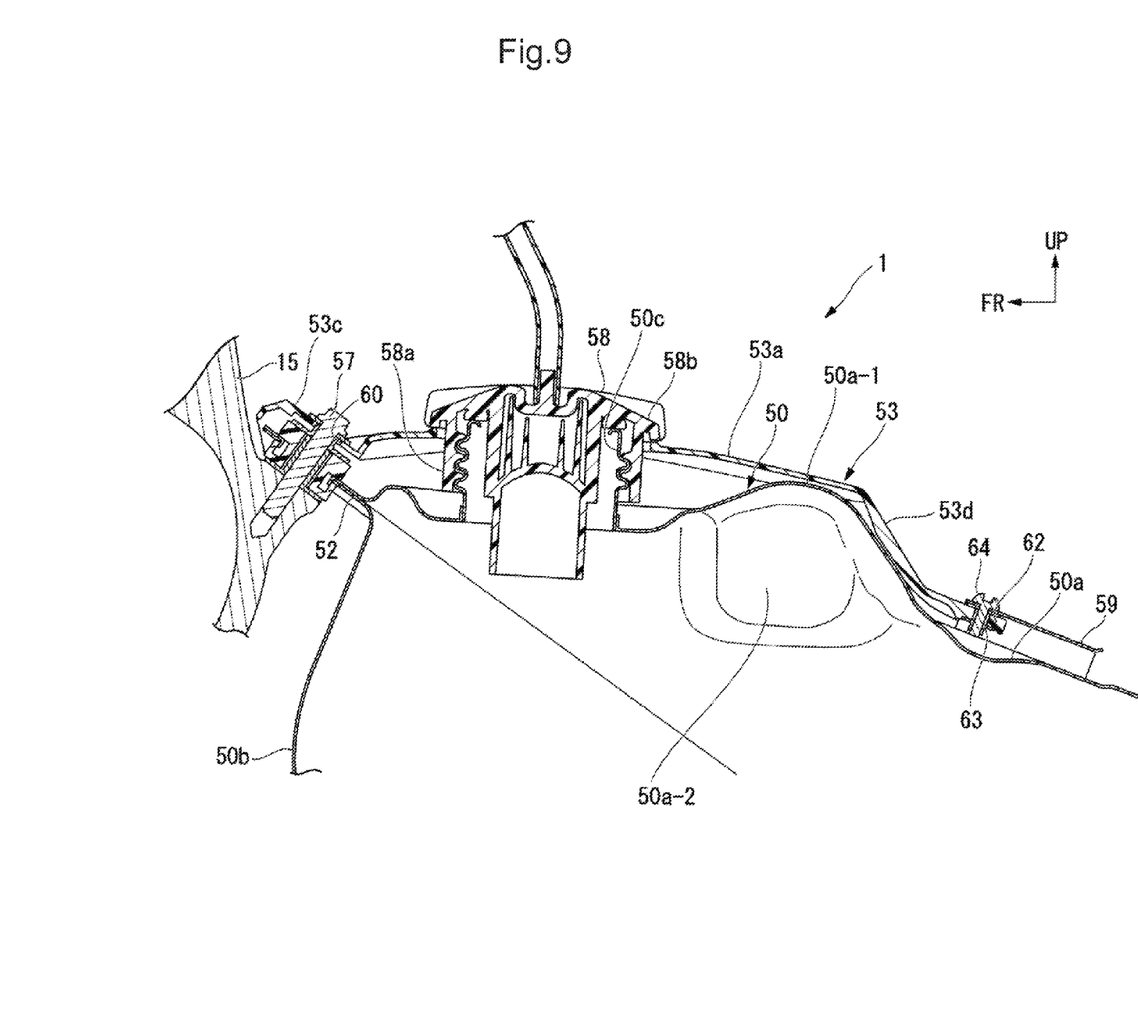
FIG. 9 is a sectional view of the straddle-type vehicle according to the embodiment of this invention taken along a line IX-IX in FIG. 8.

As illustrated in FIGS. 6, 7, and 9, a bolt insertion hole 60 is provided at the center in the vehicle widthwise direction of the front wall 53c of the top shelter 53. A stem part of the bolt 57 for securing a front edge part of the fuel tank 50 to the connecting block 15 is inserted into the bolt insertion hole 60 from outside the front wall 53c, and the front wall 53c and the front edge part of the fuel tank 50 are thereby jointly fastened and secured to the connecting block 15 with the bolt 57.

In addition, a substantially rectangular locking piece 62 extends from a lower end of the rear wall 53d at a substantially central position thereof in the vehicle widthwise direction. The locking piece 62 is inserted, with a metallic clip nut 63 attached thereto, into the space under the locking stay 59 of the fuel tank 50 from the front side. Into the clip nut 63 attached to the locking piece 62, a bolt 64 is screwed down from outside the locking stay 59. The locking piece 62 is thereby secured on the locking stay 59.

Note that, in this embodiment, the front wall 53c and the locking piece 62 located on the front and rear sides of the top shelter 53 serve as a fixation portion to be secured to the fuel tank 50.

A circular opening 53a-1 in which to insert the stem portion 58a of the filler cap 58 is formed in the upper wall 53a of the top shelter 53. Moreover, the left and right sidewalls 53b of the top shelter 53 are each formed to have a substantially triangular shape in a side view, and a substantially triangular opening 53b-1 is formed at a substantially central part of the sidewall. Further, each of the left and right sidewalls 53b has a substantially square joint portion 53b-2, which is dented inwardly in the vehicle widthwise direction, at a position adjacent to the rear side of the opening 53b-1. Each of the left and right sidewalls 53b has a substantially rectangular opening portion 53b-3 at a position adjacent to the rear side of the joint portion 53b-2. A clip nut 65 is attached to the joint portion 53b-2 through the opening portion 53b-3 located therebehind. The bolt 66 which is the fastening member for joining each of the tank shrouds 54L and 54R to the top shelter 53 is inserted into the joint portion 53b-2 and the clip nut 65, and a stem part of the bolt 66 is screwed into the clip nut 65.

In addition, a shielding wall 68 protruding outwardly in the vehicle widthwise direction is provided in an area that extends in an upper edge part of the opening portion 53b-3 of each of the left and right sidewalls 53b and then bends downwardly and rearwardly from a rear end of the upper edge part. When the tank shrouds 54L and 54R are mounted on the top shelter 53, an upper surface of the shielding wall 68 is adjacent to and faces an inner surface of an upper wall A (see FIG. 3) of the upper edge portion 54f-1 of the corresponding one of the tank shrouds 54L and 54R, and a tip part thereof is adjacent to and faces an inner surface of a sidewall of the upper edge portion 54f-1 of the corresponding one of the tank shrouds 54L and 54R.

Figure 10:
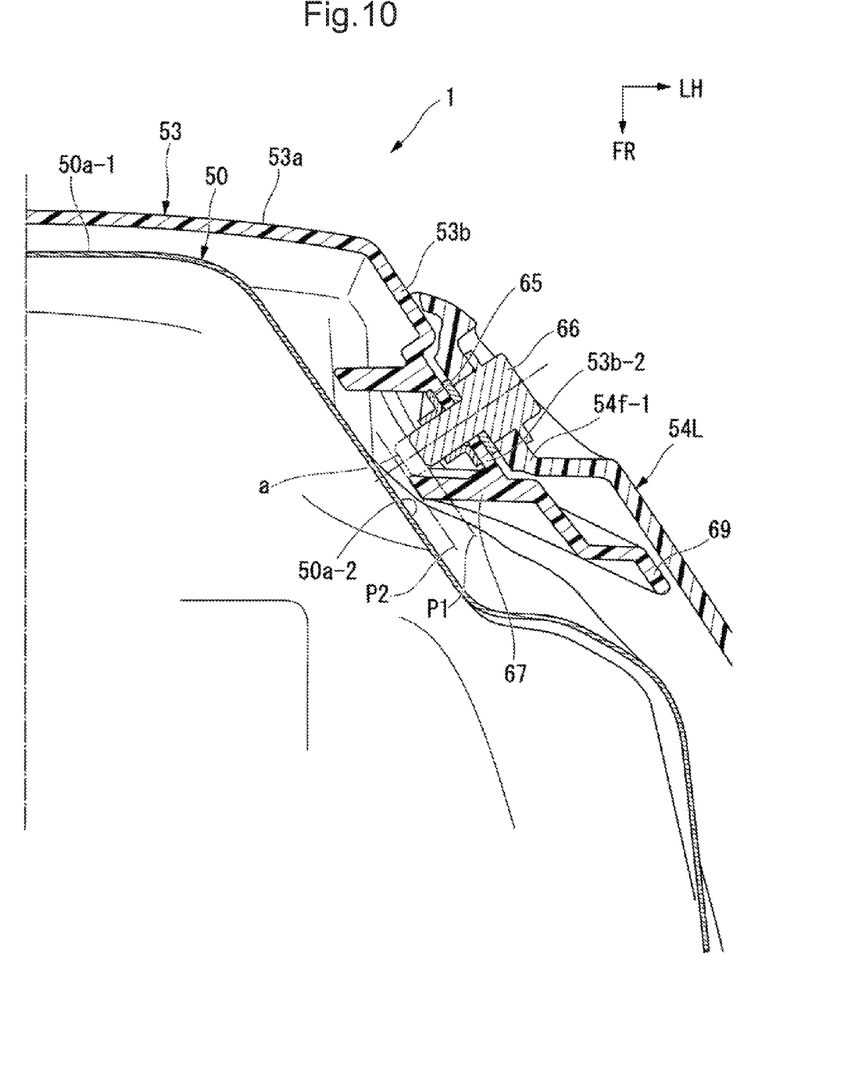
FIG. 10 is a sectional view of the straddle-type vehicle according to the embodiment of this invention taken along a line X-X in FIG. 8.

As illustrated in FIGS. 7 and 10, a convex portion 67 having a substantially U-shape in cross section protrudes on an inner surface of each of the left and right sidewalls 53b of the top shelter 53 in an area thereof that surrounds the joint portion 53b-2. An opening of the convex portion 67 with a substantially U-shape in cross section opens toward the rear of the vehicle body so that a central area of the joint portion 53b-2 may be located adjacent to the opening portion 53b-3 without being blocked by the convex portion 67. The clip nut 65 is attached to the joint portion 53b-2 in an area where no convex portion 67 protrudes. In addition, an extending end of the convex portion 67 faces a bottom wall part of the dent portion 50a-2 of the fuel tank 50 from the outside in the vehicle widthwise direction. Note, however, that the convex portion 67 does not protrude at a substantially right angle to an inner surface of the joint portion 53b-2 but tilts at a predetermined angle in an up and down direction with respect to a direction orthogonal to the inner surface of the joint portion 53b-2, as illustrated in FIG. 10.

In the case of this embodiment, as illustrated in FIG. 10, the top shelter 53 is mounted on the fuel tank 50 so that each sidewall 53b may have an inclination with respect to not only a vertical direction but also a horizontal direction. However, in the state where the top shelter 53 is mounted on the fuel tank 50, the convex portion 67 faces the bottom wall part of the dent portion 50a-2 of the fuel tank 50 in a substantially horizontal posture. In addition, the extending end of the convex portion 67 is placed at a position closer to a bottom wall (outer surface) of the dent portion 50a-2 of the fuel tank 50 than that of a tip part of the bolt 66 which is the fastening member (see an imaginary line P1 representing the position of the tip part of the bolt 66 and an imaginary line P2 representing the position of the extending end of the convex portion 67 in FIG. 10). Moreover, the extending end of the convex portion 67 extends to a position on the extension of a direction in which the bolt 66 is fastened. Accordingly, in the case where the bolt 66 having a long stem is used by mistake, the stem part of the bolt 66 comes into contact with the extending end of the convex portion 67 as illustrated by an imaginary line a in FIG. 10.

Figure 11:
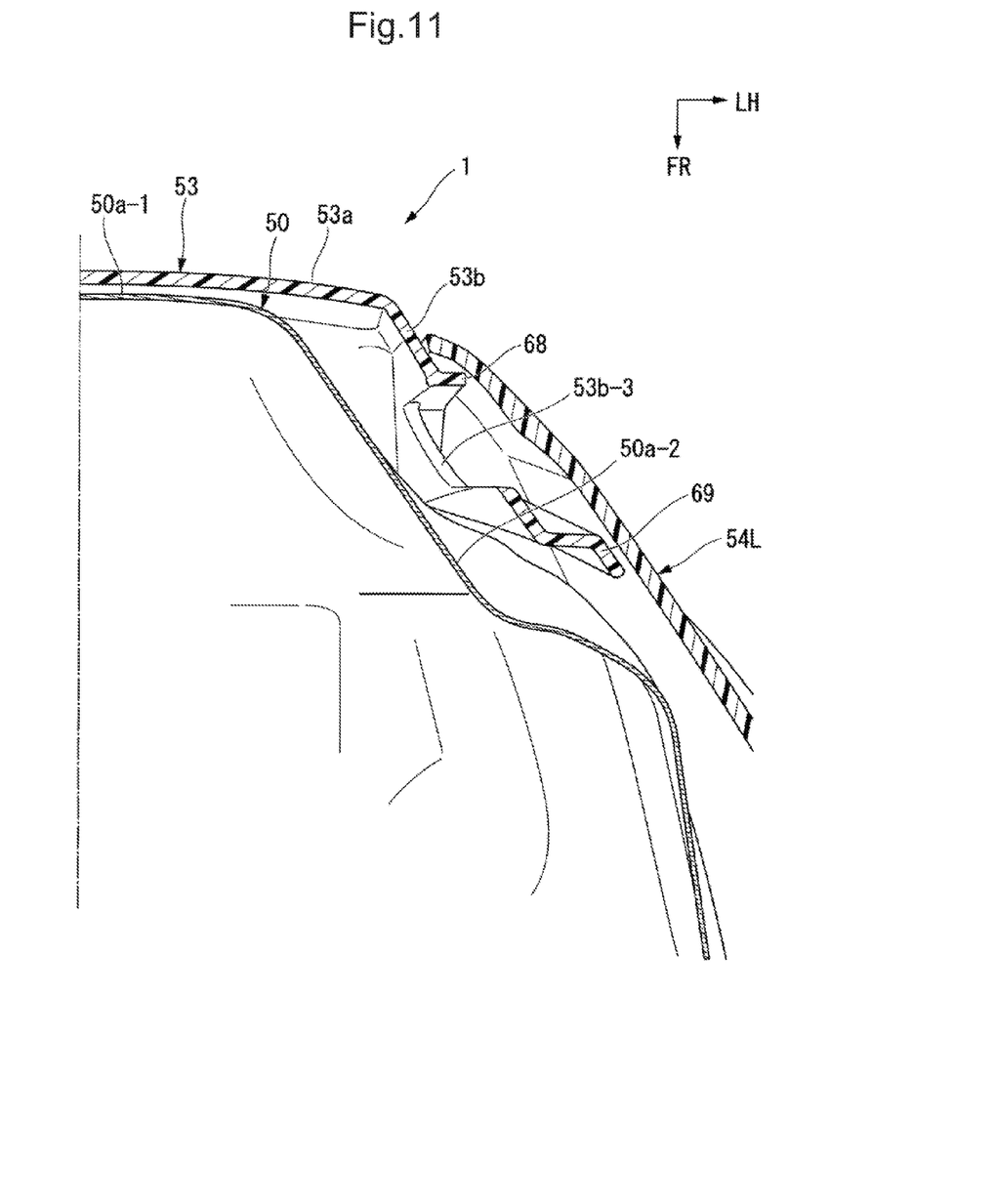
FIG. 11 is a sectional view of the straddle-type vehicle according to the embodiment of this invention taken along a line XI-XI in FIG. 8.

In addition, a flange portion 69 having a substantially L-shape in cross section extends in a lower side part of each of the left and right sidewalls 53b of the top shelter 53 (a part of the sidewall close to an end thereof below the joint portion 53b-2) so as to bend outwardly in the vehicle widthwise direction and then bend downwardly. As illustrated in FIGS. 10 and 11, this downward-bending part of the flange portion 69 is adjacent to and faces an inner surface of the corresponding one of the tank shrouds 54L and 54R when the corresponding tank shroud is mounted on the top shelter 53.

Figure 12:
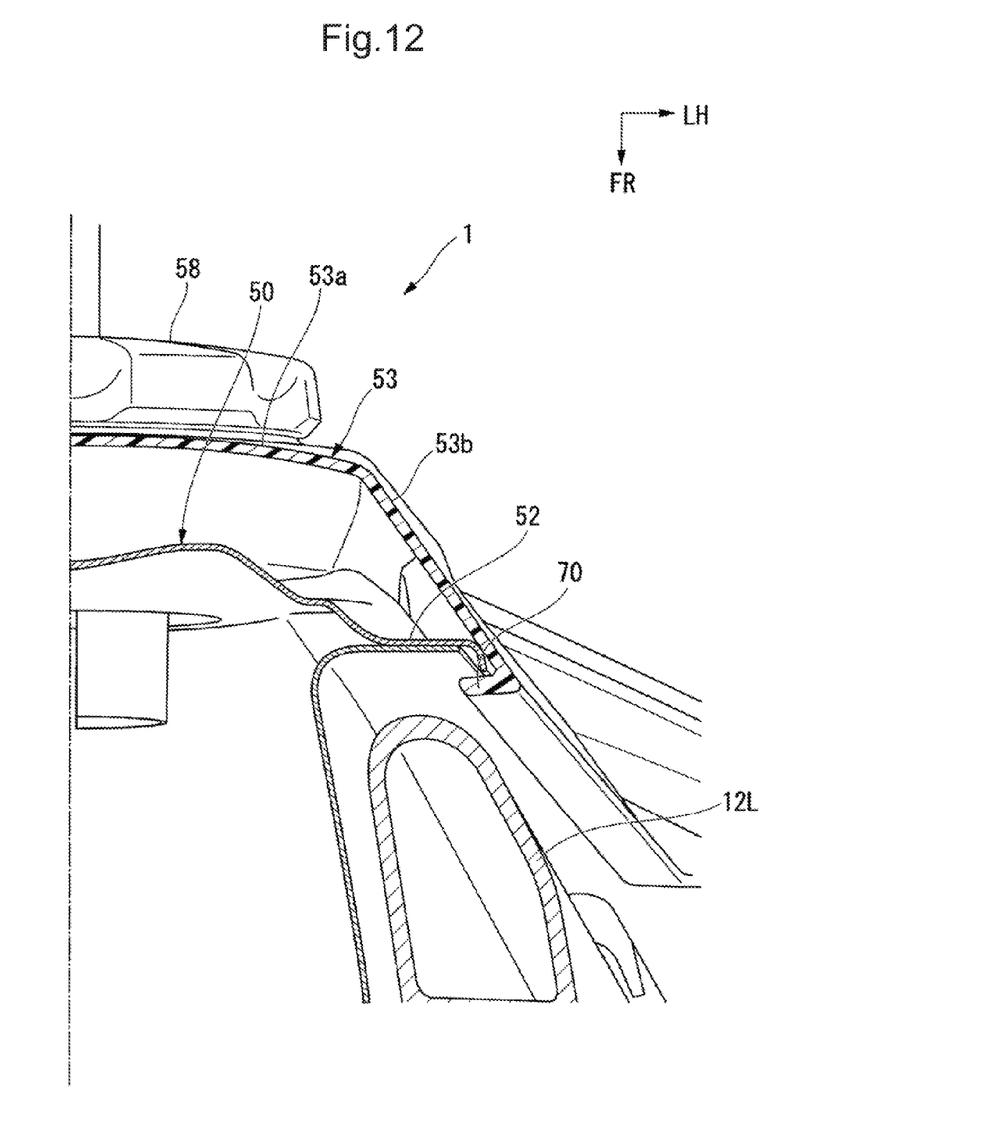
FIG. 12 is a sectional view of the straddle-type vehicle according to the embodiment of this invention taken along a line XII-XII in FIG. 8.

A bending portion 70 bending inwardly in the vehicle widthwise direction is provided on a tilting side of each of the left and right sidewalls 53b of the top shelter 53, the tilting side being adjacent to a front part of a lower side of the sidewall. The bending portion 70 is formed continuously along the tilting side. When the top shelter 53 is mounted on the fuel tank 50, as illustrated in FIG. 12, each bending portion 70 of the left and right sidewalls 53b faces, in a substantially horizontal posture, a lower surface of the joint flange 52 of the fuel tank 50 that projects outwardly in the vehicle widthwise direction. The bending portion 70 partially covers the joint flange 52 from below.

As has been described above, in the motorcycle 1 according to this embodiment, the stem part of the bolt 66 that fastens the joint portion 54f-1 of each of the tank shrouds 54L and 54R to the joint portion 53b-2 of the sidewall 53b of the top shelter 53 faces the bottom wall (outer surface) of the dent portion 50a-2 of the fuel tank 50, but the convex portion 67 protrudes from the inner surface of the sidewall 53b of the top shelter 53, in a part thereof surrounding the joint portion 53b-2, so as to face the bottom wall of the dent portion 50a-2 of the fuel tank 50. Thereby, even if a person such as a driver pinches the left and right tank shrouds 54L and 54R firmly between his/her knees at the time of driving of the motorcycle 1, for example, and thus deforms the tank shrouds 54L and 54R and the sidewalls 53b of the top shelter 53 in directions toward the fuel tank 50, the convex portions 67 can restrict input of a large load from the stem parts of the bolts 66 to the fuel tank 50.

In particular, according to this embodiment, the extending end of each convex portion 67 is placed at a position closer to the outer surface of the fuel tank 50 than that of the stem part of the bolt 66. Accordingly, even if the tank shrouds 54L and 54R and the top shelter 53 are deformed upon receipt of external force, the convex portions 67 of the resin-made top shelter 53 come into contact with the outer surface of the fuel tank 50 earlier than the stem parts of the bolts 66. Thereby, it is possible to keep a predetermined clearance or more between the stem parts of the bolts 66 and the fuel tank 50.

In addition, in the motorcycle 1 according to this embodiment, the extending end of each of the convex portions 67 provided on the top shelter 53 extends to a position on the extension of the direction in which the bolt 66 is fastened. Accordingly, in the case where the bolt 66 having a long stem is used by mistake, the stem part of the bolt 66 comes into contact with the convex portion 67, thus making it possible to make an operator aware of the situation where a bolt that does not conform to specifications is about to be used by mistake. Thereby, erroneous assembly of parts can be prevented by employing this structure.

Moreover, in the motorcycle 1 according to this embodiment, the upper edge portion of each of the tank shrouds 54L and 54R is coupled to the sidewall 53b of the top shelter 53 with the bolt 66 while being laid on the outer side of the sidewall, the opening portion 53b-3 is provided in the part of the sidewall 53b of the top shelter 53 adjacent to the joint portion 53b-2, and the shielding wall 68 protruding in a direction toward the inner surface of the tank shroud is provided in the area that extends in the upper edge part of the opening portion 53b-3 of the sidewall and then bends downwardly and rearwardly from the rear end of the upper edge part. Accordingly, even when a person tries to look into the inside through the gap between the parts of each of the left and right tank shrouds 54L and 54R and the top shelter 53 where they butt against each other, the shielding wall 68 blocks his/her view in an inward direction and can thereby prevent the opening portion 53b-3 from being visible through the gap. Thus, the appearance quality of the motorcycle 1 can be improved by employing this structure.

In addition, in the motorcycle 1 according to this embodiment, the upper edge portion of each of the tank shrouds 54L and 54R is coupled to the sidewall 53b of the top shelter 53 with the bolt 66 while being laid on the outer side of the sidewall, and the flange portion 69 bending in a substantially L-shape to be close to the inner surface of the tank shroud is provided on a lower end of the sidewall 53b of the top shelter 53. Thereby, the flange portion 69 increases the section modulus of the lower side of the sidewall 53b of the top shelter 53, which makes a part of the sidewall 53b near the joint portion 53b-2 less likely to be deformed. Thus, by employing this structure, it is possible to inhibit the tank shrouds 54L and 54R and the top shelter 53 from being deformed upon receipt of external force and thereby inhibit the stem parts of the bolts 66 from getting close to the outer surface of the fuel tank 50.

Further, in the motorcycle 1 according to this embodiment, the front wall 53c and locking piece 62 to be fastened and secured to the fuel tank 50 are provided at front and rear end parts of the upper wall 53a of the top shelter 53, the flange portion 69 is provided on the lower side of each sidewall 53b of the top shelter 53, and the bending portion 70 that covers the joint flange 52 of the fuel tank 50 from below is provided on the tilting side of the sidewall 53b on the front side thereof. Thereby, the flange portion 69 increases the section modulus of the lower side of the sidewall 53b of the top shelter 53 and the bending portion 70 increases the section modulus of the tilting side adjacent to the lower side, thus making it possible to inhibit the deformation of the sidewall 53b of the top shelter 53 more effectively.

Furthermore, in the case of employing this structure, when the top shelter 53 is mounted on the fuel tank 50, the front wall 53c on the front end side of the upper wall 53a and the locking piece 62 on the rear end side thereof can be fastened and secured to the fuel tank 50 while the bending portions 70 on the tilting sides of the sidewalls 53b cover the joint flange 52 of the fuel tank 50 from below. Thereby, with a simple configuration, the top shelter 53 can be mounted on the fuel tank 50 easily and with high rigidity.

In addition, in this embodiment, the convex portions 67, with a substantially U-shape in cross section, and bending portions 70, that protrude on the inner side of the sidewalls 53b of the top shelter 53, tilt in the same direction. Accordingly, by employing this structure, a mold having a complicated structure does not have to be used when the top shelter 53 is molded in the mold. Thus, the top shelter can be released from the mold easily.

Note that the present invention is not limited to what is described in the above embodiments. Various design changes may be made without departing from the gist of the invention. For example, in the above embodiment, the convex portions 67 facing the surface of the fuel tank 50 at positions close to the bolts 66 are provided in the top shelter 53. However, convex portions may be provided in the tank shrouds 54L and 54R instead. Alternatively, convex portions may be provided in both the top shelter 53 and the tank shrouds 54L and 54R.

Further, the straddle-type vehicle according to the present invention is not limited to motorcycles (including motor bicycles and scooter-type vehicles) but also includes three-wheeled compact vehicles (including vehicles with one wheel at the front and two at the rear and vehicles with two wheels at the front and one at the rear) and four-wheeled compact vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A straddle vehicle comprising:
a fuel tank;
a first tank cover designed to cover a part of said fuel tank;
a second tank cover joined to said first tank cover and designed to cover another part of said fuel tank;
a fastening member designed to join said first tank cover and said second tank cover together, said fastening member being disposed to face an outer surface of said fuel tank;

at least one of said first tank cover and said second tank cover having a convex portion facing the surface of said fuel tank at a position near said fastening member;

said second tank cover is coupled to said first tank cover with said fastening member while being laid on an outer side of said first tank cover;

said first tank cover has an opening portion in a portion adjacent to a joint portion at which said first tank cover is joined to said second tank cover with said fastening member; and a shielding wall protruding in a direction toward an inner surface of said second tank cover is provided on a part of an outer edge of said opening portion.

2. The straddle vehicle according to claim 1, wherein at least a part of said convex portion is placed at a position closer to the outer surface of said fuel tank than that of said fastening member.

3. The straddle vehicle according to claim 2, wherein at least part of said convex portion is placed at a position on an extension of a direction in which said fastening member is fastened.

4. The straddle vehicle according to claim 1, wherein:

said second tank cover is coupled to said first tank cover with said fastening member while being laid on the outer side of said first tank cover; and said first tank cover is provided on an edge thereof with a flange portion bending in the direction toward the inner surface of said second tank cover at a part closer to an end of said first tank cover than a position at which said first tank cover is joined with said fastening member and being capable of making contact with the inner surface of said second tank cover.

5. The straddle vehicle according to claim 4, wherein said fuel tank has a joint flange projecting outward in a vehicle widthwise direction, and wherein said first tank cover has a fixation portion, which is capable of being secured to said fuel tank, at an end part thereof in a longitudinal direction of a vehicle, has said flange portion at a part of an edge thereof in the vehicle widthwise direction, and has a bending portion, which is designed to cover said joint flange, at a remaining part of the edge in the vehicle widthwise direction.

6. The straddle vehicle according to claim 2, wherein:

said second tank cover is coupled to said first tank cover with said fastening member while being laid on the outer side of said first tank cover; and said first tank cover is provided on an edge thereof with a flange portion bending in the direction toward the inner surface of said second tank cover at a part closer to an end of said first tank cover than a position at which said first tank cover is joined with said fastening member and being capable of making contact with the inner surface of said second tank cover.

7. The straddle vehicle according to claim 3, wherein:

said second tank cover is coupled to said first tank cover with said fastening member while being laid on the outer side of said first tank cover; and said first tank cover is provided on an edge thereof with a flange portion bending in the direction toward the inner surface of said second tank cover at a part closer to an end of said first tank cover than a position at which said first tank cover is joined with said fastening member and being capable of making contact with the inner surface of said second tank cover.

8. A straddle vehicle comprising:

a fuel tank;

a first tank cover designed to cover a part of said fuel tank;

a second tank cover joined to said first tank cover and designed to cover another part of said fuel tank;

a fastening member designed to join said first tank cover and said second tank cover together, said fastening member being disposed to face an outer surface of said fuel tank;

at least one of said first tank cover and said second tank cover having a convex portion facing the surface of said fuel tank at a position near said fastening member, wherein said second tank cover is coupled to said first tank cover with said fastening member while being laid on the outer side of said first tank cover, wherein said first tank cover is provided on an edge thereof with a flange portion bending in the direction toward the inner surface of said second tank cover at a part closer to an end of said first tank cover than a position at which said first tank cover is joined with said fastening member and being capable of making contact with the inner surface of said second tank cover, wherein said fuel tank has a joint flange projecting outward in a vehicle widthwise direction, and wherein said first tank cover has a fixation portion, which is capable of being secured to said fuel tank, at an end part thereof in a longitudinal direction of a vehicle, has said flange portion at a part of an edge thereof in the vehicle widthwise direction, and has a bending portion, which is designed to cover said joint flange, at a remaining part of the edge in the vehicle widthwise direction.

9. A straddle vehicle comprising:

a fuel tank;

a first fuel tank cover designed to cover a part of said fuel tank;

left and right tank shrouds for covering side portions of said fuel tank, said left and right tank shrouds being joined to said first tank cover;

a fastening member for joining said first tank cover and said left and right tank shrouds together, said fastening member being disposed to face an outer surface of said fuel tank;

at least one of said first tank cover and said left and right tank shrouds having a convex portion facing the surface of said fuel tank at a position near said fastening member said second tank cover is coupled to said first tank cover with said fastening member while being laid on an outer side of said first tank cover;

said first tank cover has an opening portion in a portion adjacent to a joint portion at which said first tank cover is joined to said second tank cover with said fastening member; and a shielding wall protruding in a direction toward an inner surface of said second tank cover is provided on a part of an outer edge of said opening portion.

10. The straddle vehicle according to claim 9, wherein at least a part of said convex portion is placed at a position closer to the outer surface of said fuel tank than that of said fastening member.

11. The straddle vehicle according to claim 10, wherein at least part of said convex portion is placed at a position on an extension of a direction in which said fastening member is fastened.

12. The straddle vehicle according to claim 9, wherein:

said left and right tank shrouds are coupled to said first tank cover with said fastening member while being laid on the outer side of said first tank cover; and said first tank cover is provided on an edge thereof with a flange portion bending in the direction toward the inner surface of said left and right tank shrouds at a part closer to an end of said first tank cover than a position at which said first tank cover is joined with said fastening member and being capable of making contact with the inner surface of said left and right tank shrouds.

13. The straddle vehicle according to claim 10, wherein:
said left and right tank shrouds are coupled to said first tank cover with said fastening member while being laid on the outer side of said first tank cover; and
said first tank cover is provided on an edge thereof with a flange portion bending in the direction toward the inner surface of said left and right tank shrouds at a part closer to an end of said first tank cover than a position at which said first tank cover is joined with said fastening member and being capable of making contact with the inner surface of said left and right tank shrouds.

14. The straddle vehicle according to claim 12, wherein:
said fuel tank has a joint flange projecting outward in a vehicle widthwise direction, and
said first tank cover has a fixation portion, which is capable of being secured to said fuel tank, at an end part thereof in a longitudinal direction of a vehicle, has said flange portion at a part of an edge thereof in the vehicle widthwise direction, and has a bending portion, which is designed to cover said joint flange, at a remaining part of the edge in the vehicle widthwise direction.

* * * * *